United States Patent [19]
Yates et al.

[11] Patent Number: 5,123,786
[45] Date of Patent: Jun. 23, 1992

[54] MILLING CUTTERS

[75] Inventors: John T. Yates, Redditch; Nicholas P. Thornton, Halesowen, both of England

[73] Assignee: Sandvik Ltd., West Midlands, England

[21] Appl. No.: 608,530

[22] Filed: Nov. 2, 1990

[30] Foreign Application Priority Data

Nov. 9, 1989 [GB] United Kingdom ............... 8925360

[51] Int. Cl.$^5$ ............................................... B23C 5/24
[52] U.S. Cl. ...................................... 407/38; 407/25; 407/29; 407/35; 407/43; 407/61
[58] Field of Search .................. 407/29, 34, 36–39, 407/42, 44, 45, 61, 62, 23–26, 35, 43, 70, 71, 113, 114, 56, 58, 59; 51/288

[56] References Cited

U.S. PATENT DOCUMENTS

| | | | |
|---|---|---|---|
| 3,574,251 | 4/1971 | Corti | 51/288 X |
| 4,218,159 | 8/1980 | Langen | 407/25 |
| 4,551,043 | 11/1985 | Kirchberger | 407/43 |
| 4,729,697 | 3/1988 | Lacey | 407/114 X |

FOREIGN PATENT DOCUMENTS

| | | |
|---|---|---|
| 0050270 | 4/1982 | European Pat. Off. |
| 0167504 | 1/1986 | European Pat. Off. |
| 2541157 | 8/1984 | France |
| 59-14415 | 1/1984 | Japan |

OTHER PUBLICATIONS

Article: "Machines and Tooling", vol. 30, No. 10 (1959) pp. 33–34, *Productive Machining Using End Mills*, Engineering Research Association, G. G. Ovumyan.

Primary Examiner—Steven C. Bishop
Attorney, Agent, or Firm—Burns, Doane, Swecker & Mathis

[57] ABSTRACT

A milling cutter has replaceable cutting inserts mounted on a toothed disc or drum body. Seatings for the inserts on the teeth locate them at spaced intervals on the periphery of each tooth. The inserts of at least one tooth of the body are peripherally staggered in their seatings relative to the inserts on at least one other tooth such that the staggered and spaced inserts on the teeth have paths of rotation that intersect to define a continuous profiled cutting line. The inserts have their cutting edges ground in situ on the teeth to define the profile of the cutting line. By this method a finish quality profiled surface can be produced using cutting inserts that are initially of standard form.

14 Claims, 4 Drawing Sheets

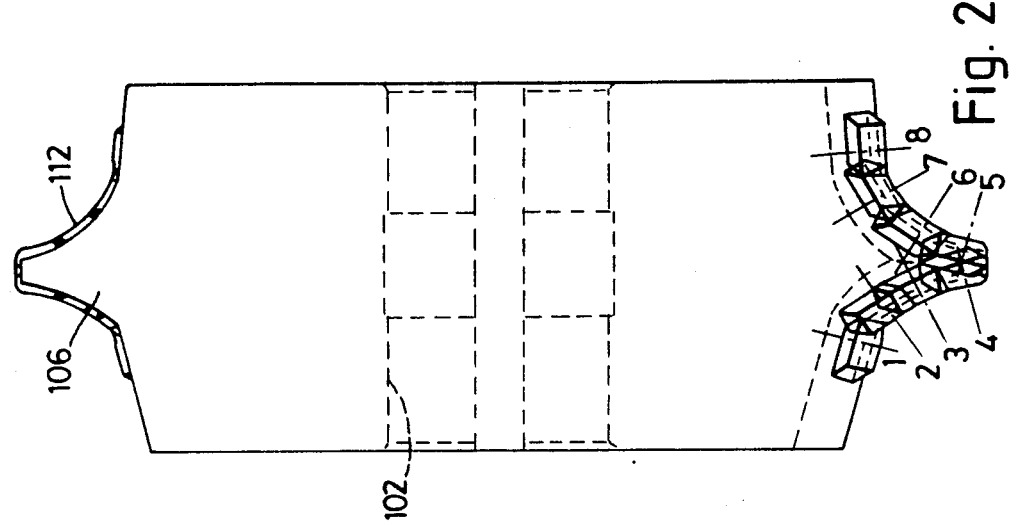
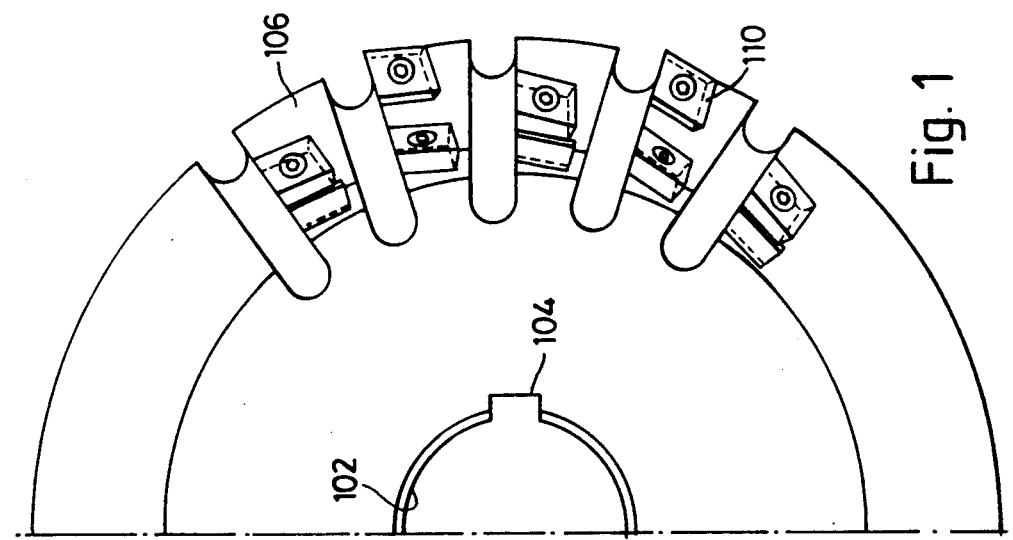

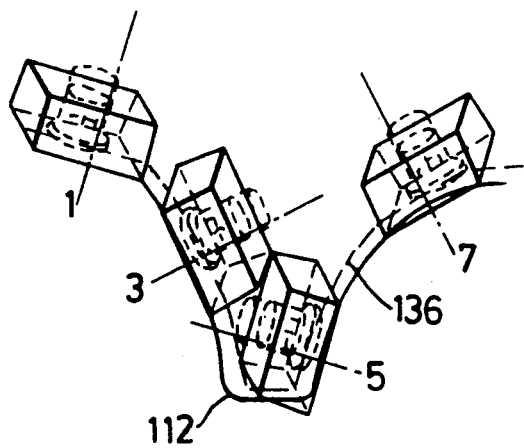
Fig. 3
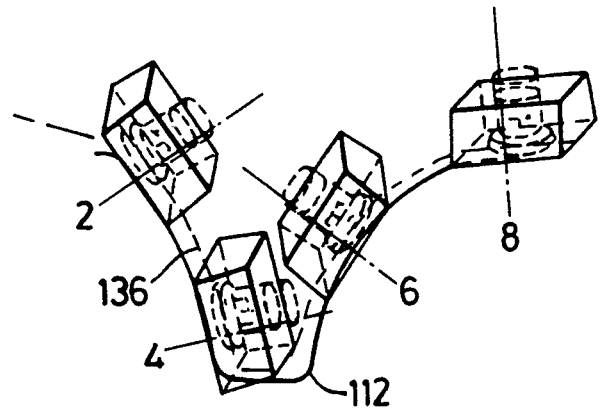
Fig. 4
Fig. 5(a)
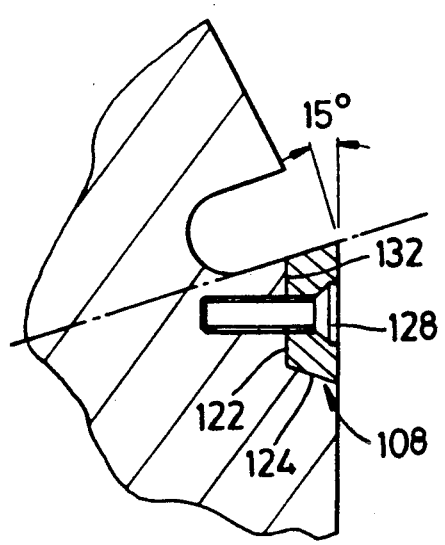
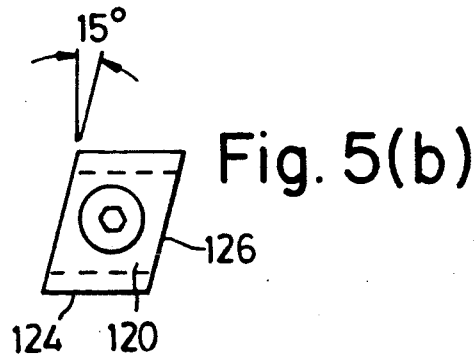
Fig. 5(b)

MILLING CUTTERS

BACKGROUND OF THE INVENTION

This invention relates to milling cutters for cutting profile shapes. It is particularly concerned with milling cutters that are provided with replaceable cutting inserts.

It is known to rough-cut a profile shape with a milling cutter that carries a series of replaceable cutting inserts. These inserts are preformed, typically by sintering, and have parallelogramic top faces so as to be reversible on the cutter. The inserts are mounted in positions such that their active cutting edges sweep a series of overlapping surfaces of revolution and rough out the profile shape as a series of mutually inclined portions. Finish machining is then necessary to obtain a smooth profile.

A similar milling cutter has been proposed as a gear hob (GB 1597599) in which a series of reversible cutting inserts are secured to successive teeth of a cutter disc, the inserts being mainly rectangular but at the radially outer tips of the teeth there being circular inserts or inserts with a bulbous curved cutting edge to relieve the gear tooth roots. In order to cut the involute gear tooth profile, of course, the rotation of the cutter must be coordinated with an indexing motion of the gear being cut. Furthermore, although the document suggests that the cutter can hob gear teeth to a finish quality, the trueness of the profile is plainly limited because finish grinding is recommended for heavy duty gears.

SUMMARY OF THE INVENTION

According to one aspect of the present invention there is provided a milling cutter comprising a rotatable body on which there is at least one circumferentially arranged series of teeth with seatings for cutting inserts, at least some of the teeth having a plurality of said seatings spaced from each other on the periphery of the tooth and the inserts of at least one said tooth of said series being peripherally staggered in their seatings relative to the inserts on at least one other tooth such that the staggered and spaced seatings give the inserts paths of rotation that intersect to form a continuous profile cutting line, at least some of the inserts having their cutting edges ground in situ on the teeth to define the profile of said cutting line.

The seatings for the individual inserts may be formed integrally in said teeth of the disc or drum body. Alternatively the body may be provided with carriers or shoes, each having mountings for a plurality of inserts. If the carriers are replaceable, the inserts can be pre-mounted on them in appropriate relative positions, so simplifying the replacement of the inserts. Each carrier may also be adjustably secured so that the inserts it carries can be positioned as a group.

Preferably, the inserts have a pair of parallel opposite faces one of which provides the clearance face extending rearwards from the cutting edge in the cutting direction and said faces are the major faces of the insert configuration.

According to another aspect of the invention, there is provided a method of producing a milling cutter for cutting a profiled shape, in which a rotatable cutter body has at least one series of teeth around its circumference on which cutting inserts are mounted replaceably, on at least some of the teeth a plurality of said inserts are mounted at spaced intervals and at staggered relative positions on at least one said tooth relative to at least one other said tooth, so that said inserts have intersecting paths of rotation, at least some of said inserts being given profile ground cutting edges while they are secured in place on the cutter body, thereby to define jointly a continuous profiled cutting line to be swept by said cutting edges for producing said profiled shape.

The initial clearance angle at a cutting edge on an insert of a cutter according to the invention is preferably not less than 10° before grinding. Without impairing the security or operation of the insert to any material extent the clearance face can, in fact, be set to a substantially larger clearance angle, eg. over 12°. By providing a large initial clearance angle it is possible to form the profile by grinding away the clearance face at the cutting edge to a smaller clearance angle and leave sufficient of the clearance face unaltered to allow a regrinding operation subsequently, before the inserts must be indexed or replaced. To this end it is desirable to arrange that the insert is so formed and positioned that it has one of its larger faces as a clearance face.

It will normally be convenient to employ inserts that have a regular quadrilateral clearance face, eg. a rectangular or lozenge-shape, even when the grinding imparts a marked curvature to the cutting edges, eg. if a sharply radiused profile is to be cut at the outer tips of the cutter teeth. It should then still be possible to leave at least one pair of edges of the insert unchanged by the grinding of the first cutting edge profile and ready to be ground to the desired profile when the insert is indexed.

The invention will be described in more detail by way of example with reference to the accompanying drawings.

BRIEF DESCRIPTION OF THE DRAWINGS

FIGS. 1 and 2 are diagrammatic illustrations of a first milling cutter according to the invention, in side and front views respectively, FIG. 2 showing a composite view of the pattern in which cutting inserts are disposed on the cutter, FIGS. 3 and 4 show the pattern of the receiving recesses and their inserts on successive teeth of the cutter of FIG. 1, FIG. 5(*a*) is a fragmentary cross sectional view depicting the seating of an insert on a tooth;

FIG. 5(*b*) is a plan view of an insert;

DESCRIPTION OF THE PREFERRED EMBODIMENTS

Figure 6:
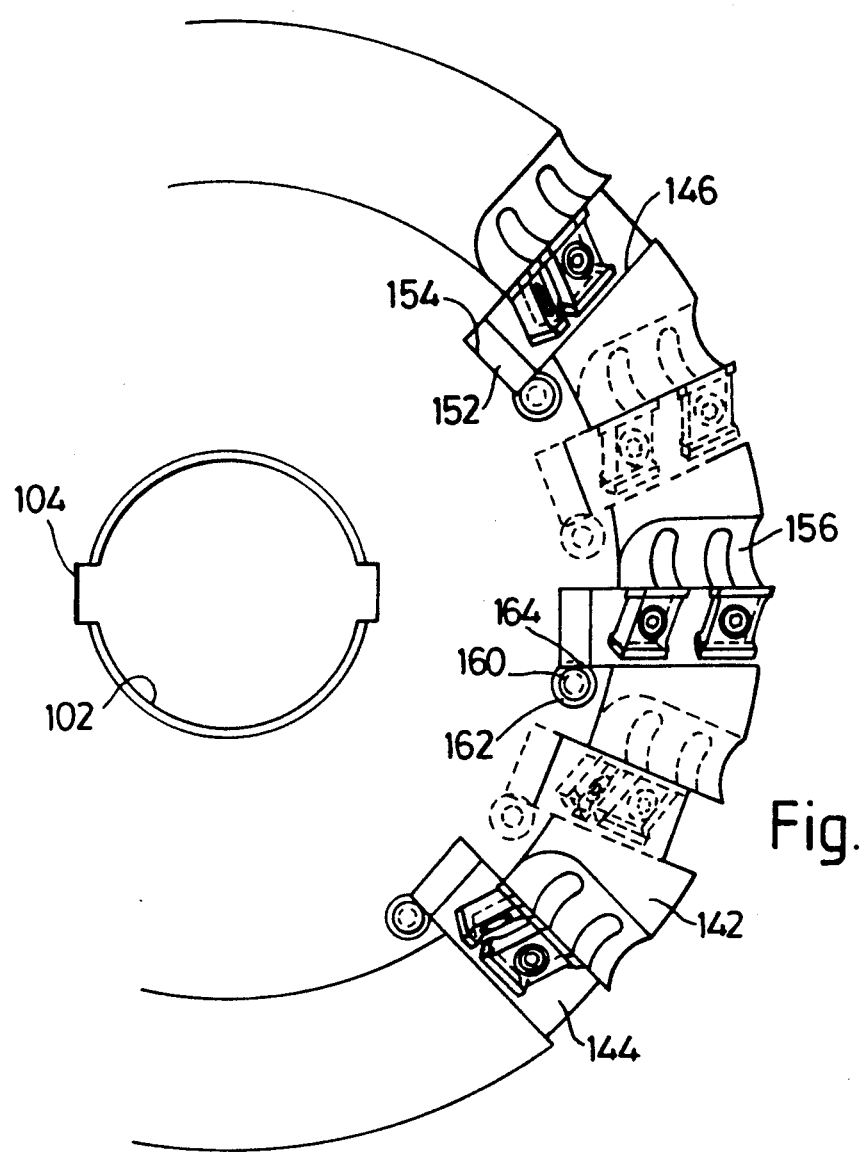
FIG. 6 is an illustration, similar to FIG. 1, of a second milling cutter according to the invention, FIGS. 7(*a*)–(*d*) and 8(*a*)–(*d*) show two alternative arrangements of inserts for the cutter of FIG. 6 and FIGS. 9 and 10 are detail cross-sectional views of the insert mountings in FIGS. 7 and 8 respectively.

The disc-shaped milling cutter in FIGS. 1 and 2 has a conventional bore 102 and keyway 104 to mount it on the arbour of a milling machine. It is fluted at intervals around its periphery to form a series of teeth 106 of identical form, except for the seatings 108 (FIG. 5) which they contain for a series of reversible cutting inserts 110 providing the cutting edges of the tool.

As regards these seatings, they are formed in two different patterns, each pattern being provided on alternate teeth 106. FIGS. 3 and 4 illustrate the two patterns in each of which the inserts are set at spaced intervals around the front face of the tooth. As is clear from FIG. 1, the front faces of the inserts lie in radial planes of the cutter disc, ie. at zero radial rake. In this example, additionally, the front faces of the teeth are coincident with the front faces of their inserts. The alternate teeth of the cutter disc have the locations of the inserts staggered so that the positions of the inserts of two successive teeth, when combined, make up the overlapping series that appears in FIG. 2. Thus, with one tooth (FIG. 3) carrying inserts 1, 3, 5, 7 of the profile, and the other tooth (FIG. 4) carrying inserts 2, 4, 6, 8, the composite pattern of inserts 1–8 of FIG. 2 is obtained, in effect.

The positions of the inserts are so arranged that, in their initial polygonal form, the surfaces of revolution swept by their active cutting edges project beyond the intended profile to be cut. With the inserts in position, the active cutting edges are ground back to the intended profile line, indicated at 112 (FIG. 2). As a result of this and the overlapping of the individual inserts on successive teeth, the precise profile can be milled by the cutter, obviating the need for a further finishing operation. Because the inserts have their cutting edges shaped when they are firmly in place on the milling cutter, accuracy can be ensured.

The insert illustrated in FIG. 5 before profile grinding has parallel main faces 120, 122 of parallelogram shape, front and rear faces 124 inclined inwards from the top face, and side faces 126 perpendicular to the top face, so that the insert is indexable front to rear in its seating. It is secured by a central screw 128. The seating has a bottom face 132 that, in a radial plane of the tool, lies at an angle, typically 75°, to a radius passing through its front edge. The top or clearance face 120 of the insert thus has a clearance angle, typically 15°.

The seating may similarly have a side face (not shown) for one side face 126 of the insert so oriented that the exposed opposite side face of the insert lies at a 15° clearance angle also. In the illustrated example, this latter clearance is usually required only for the inserts at the outer tips of the cutter teeth, as can be seen in FIGS. 3 and 4. FIGS. 3 and 4 illustrate by the broken line 136 the contour of the cutter body.

To shape the final cutting profile, with the inserts secured in place the clearance faces 120, 126 are ground back as required to reform the active cutting edges of the initially polygonal inserts, each face being ground in a plane oblique to its initial clearance angle. The grinding cut runs out on the clearance face to leave only a portion of that face from its junction with the cutting edge at a clearance angle substantially less than the 15° angle to which the faces are originally set. The run-out of the grinding cut on these faces is preferably a sufficiently small distance from the active cutting edge to allow regrinding of the cutting edges in the same manner, to prolong their use, before the inserts are indexed and the opposite cutting edges formed to the profile by grinding the opposite regions of the clearance faces in the same manner.

In the second form of cutter illustrated, parts identical to those already described in the first form of cutter are indicated by the same reference numbers. In this second example, however, the cutting inserts 140 are not received directly in seatings integral with the teeth 142 at the periphery of the cutter body. The inserts 140 are mounted instead in groups of two or more on carriers or shoes 144 that are themselves adjustably secured in slots 146 that are formed integrally in the teeth 142.

Each slot 146 has a rear face 148 against which the shoe 144 bears. Between the slot rear face and the shoe there is a tenon connection 150 allowing the shoe to slide over the rear face in the axial direction of the tenon. The position of adjustment of the shoe 144 on the tenon connection is controlled by a wedge 152 sandwiched between the shoe and bottom face 154 of the slot and displaceable parallel to the bottom face. After the wedge has been adjusted to set the position of the shoe axially of the tenon connection, the shoe can be locked in place by one or more clamping wedges 156 adjacent the slot 146 that can be tightened onto the cutter body by screws (not shown). The movement of each adjusting wedge is obtained by rotating a pin 160 that is threaded into the cutter body and that has a collar 162 engaging a recess 164 of the wedge so that the wedge moves parallel to the slot rear face 148 as the screw is rotated.

Figure 9:
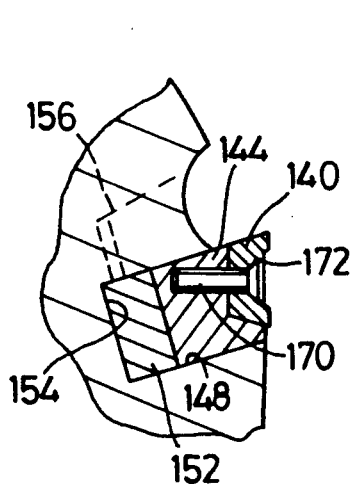
Figure 10:
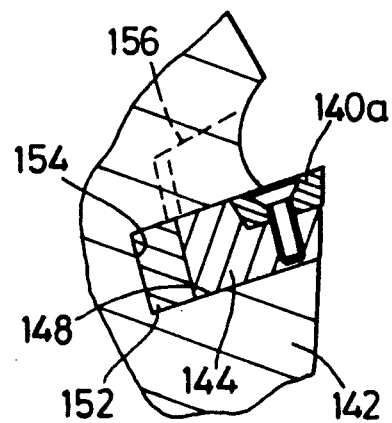
Figure 7A:
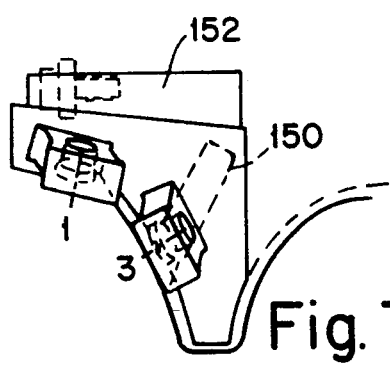
Figure 7B:
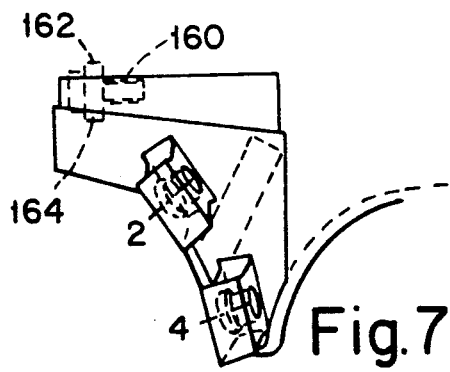
Figure 7C:
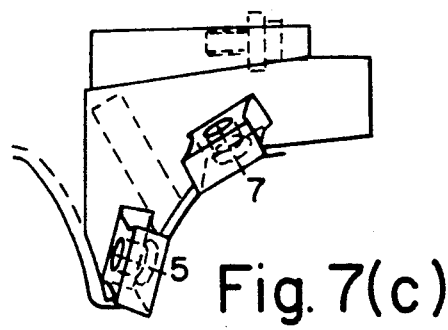
Figure 7D:
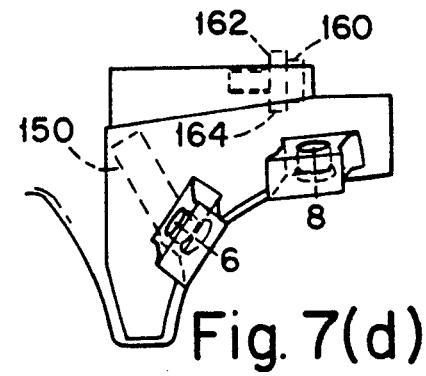
Figure 8A:
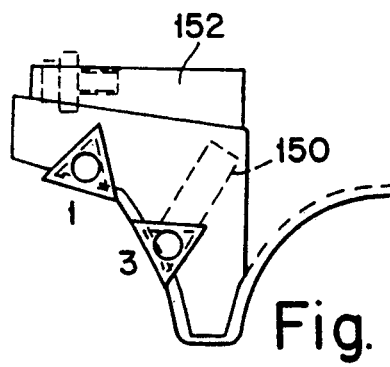
Figure 8B:
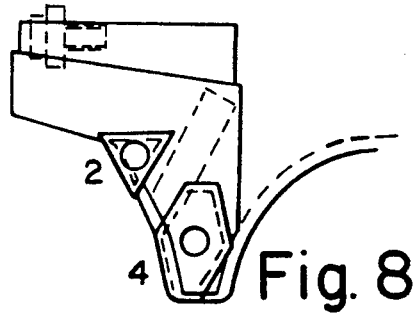
Figure 8C:
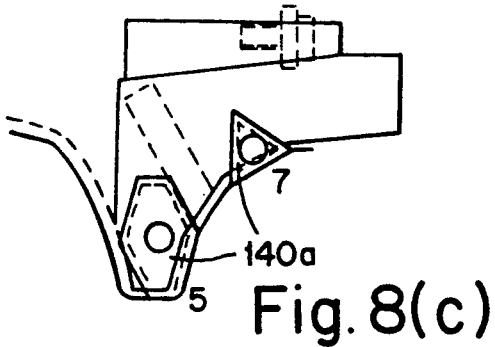
Figure 8D:
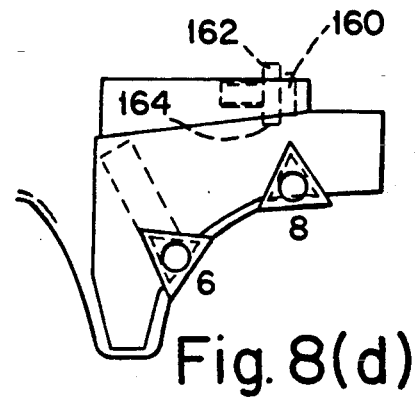

FIGS. 7(a) to (d) and FIG. 9 show the inserts 140 mounted tangentially on the cutter body, similarly to the inserts of the first example, with approximately radially directed clamping screws 170 securing them to their shoe. As can be seen in FIG. 9, the top face of the insert has a central relief 172 to give a separate top land at each cutting edge which can be ground independently of the other land and without complication from grinding wheel run-out.

FIGS. 8(a)–(d) and FIG. 10 show inserts 140a mounted radially on their shoes, with approximately tangentially directed clamping screws. It will be understood that the original shapes of the inserts may be varied to suit best the particular profiles to be cut, and this example also shows the use of indexable inserts of shapes other than a parallelogram. In other respects the arrangement is identical to that shown in FIG. 7 and 9 and the same reference numbers are used for the same parts.

In this second example of a cutter according to the invention, it can be seen from FIGS. 7 and 8, the composite pattern of insert forming the cutting profile is distributed over four successive teeth 142 of the cutter body, preferably alternating on opposite sides of successive teeth. Thus, beginning with the tooth carrying the inserts 1, 3, the next tooth will have 5, 7, followed by 2, 4 and then 6, 8. FIG. 7 and 8 also illustrate how the individual shoes project axially of the cutter across the maximum radius of the profile.

Another feature brought out by FIGS. 7 and 8 is the orientation of the tenon at an oblique angle to the radial direction. When the cutting profile of the tool is to be reground, each shoe, with its inserts remaining fixed to it, is advanced along the tenon and, because of the oblique angle of advance, the amount of material to be ground away can be minimised. The substantial overlap of the inserts of different teeth of the pattern at the center of the profile is able to accommodate the axial movement of the inserts that occurs in this adjustment. The angle of obliquity of the tenon to the radial direction will vary with the profile concerned, but for best effect the angle will usually be set at approximately the mean of the range of obliquity of the profile itself over that portion of the profile spanned by the inserts on the shoe. Thus different angles may be utilised on different teeth of the same cutter.

It may be noted from a comparison of FIG. 6 and 9 that the shoe recesses in which the inserts are carried are not shown in FIG. 6, for clearer illustration of other features of the construction.

Many modifications are possible within the scope of the invention. For example, the pattern of overlapping inserts can be deployed over more than two successive teeth, if required. Also, the teeth of the cutter can be differentially pitched to give a smoother cutting action.

We claim:

1. A milling cutter comprising a rotatable body, at least one circumferentially arranged series of teeth on said body, a series of replaceable cutting inserts mounted on said teeth, a plurality of insert carriers releasably secured to the cutter body, each said carrier providing a common attachment for a plurality of inserts of said series of inserts, at least two of said teeth having a respective said carrier locating at least two inserts attached thereto spaced from each other on the periphery of the associated tooth, the inserts of at least one said tooth being peripherally staggered relative to the inserts on at least one other said tooth, said staggered and spaced inserts having paths of rotation that intersect for forming a continuous profile cutting line, at least some of the inserts of said series of inserts having cutting edges ground in situ on the teeth to define the profile of said cutting line, said line comprising a region of maximum radius between regions of lesser radius, at least a plurality of said carriers extending wholly or mainly to one or other side of said region of maximum radius and being adjustable on said body obliquely outwardly and away from said region of maximum radius.

2. A cutter according to claim 1 wherein the inserts on successive teeth are arranged in groups that are offset relative to each other in the direction of an axis of rotation of the cutter.

3. A cutter according to claim 1 wherein the inserts each comprise a front face and a clearance face, a cutting edge of the insert being formed by the junction of said faces, at least some of the inserts having said clearance face larger than the front face.

4. A cutter according to claim 1 wherein the inserts each comprise a front face and a clearance face at an oblique angle to the front face, a cutting edge being formed by the junction of said faces, said oblique angle being greater immediately adjacent the cutting edge than at a region of the clearance face further therefrom.

5. A cutter according to claim 1 wherein at least some of the inserts each comprise a clearance face having a central recess and respective lands at opposite sides of the recess, said lands extending to opposite edges of the clearance face for forming at said edges alternative cutting edges of the insert.

6. A milling cutter comprising a rotatable body, at least one circumferentially arranged series of teeth on said body, a series of replaceable cutting inserts mounted on said teeth, a plurality of insert carriers releasably secured to the cutter body, each said carrier providing a common attachment for a plurality of inserts of said series of inserts, at least two of said teeth having a respective said carrier locating at least two inserts attached thereto spaced from each other on the periphery of the associated tooth, the inserts of at least one said tooth being peripherally staggered relative to the inserts on at least one other said tooth, said staggered and spaced inserts having paths of rotation that intersect for forming a continuous profile cutting line, at least some of the inserts of said series of inserts having cutting edges ground in situ on the teeth to define the profile of said cutting line, the carriers being displaceably adjustable on the cutter body, guide means on said body engaging the carries for said adjustment of the carriers obliquely to the axis of rotation of the cutter.

7. A cutter according to claim 6, wherein the inserts on successive teeth are arranged in groups that are offset relative to each other in the direction of an axis of rotation of the cutter.

8. A cutter according to claim 6, wherein the inserts each comprise a front face and a clearance face, a cutting edge of the insert being formed by the junction of said faces, at least some of the inserts having said clearance face larger than the front face.

9. A cutter according to claim 6, wherein the inserts each comprise a front face and a clearance face at an oblique angle to the front face, a cutting edge being formed by the junction of said faces, said oblique angle being greater immediately adjacent the cutting edge than at a region of the clearance face further therefrom.

10. A cutter according to claim 6, wherein at least some of the inserts each comprise a clearance face having a central recess and respective lands at opposite sides of the recess, said lands extending to opposite edges of the clearance face for forming at said edges alternative cutting edges of the insert.

11. A cutter according to claim 6 wherein wedge means are provided for the displacement of the carriers in said adjustment.

12. A method of producing a milling cutter for cutting a profiled shape, comprising the steps of providing a rotatable cutter body with at least one series of teeth around its circumference;

mounting insert carriers on said rotatable cutter body;

mounting cutting inserts replaceably on said teeth, at a periphery of said teeth, at least some of said inserts being mounted in groups of at least two inserts on respective said carriers;

disposing a plurality of said inserts on each of at least a plurality of said teeth at spaced peripheral intervals on the respective tooth;

disposing said plurality of inserts on at least one of said plurality of teeth in staggered relation peripherally of the tooth with respect to at least one insert on another of said teeth such that the inserts have intersecting paths of rotation;

giving at least some of said inserts profile ground cutting edges while they are secured in place on the cutter body, thereby to define jointly a continuous profiled cutting line to be swept by said cutting edges for producing said profile shape;

adjusting at least some of said inserts in position on the cutter body for regrinding said profiled cutting line;

performing said adjustment of the inserts by displacement of at least one of said carriers in a direction oblique to an axis of rotation of said rotatable cutter body.

13. A method according to claim 12 wherein the profile grinding is confined to a region of at least one edge of at least some of the inserts such as to leave a corresponding region of an opposite edge or edges of each said insert to be ground similarly for the reuse of the inserts.

14. A method according to claim 12 wherein the clearance angle of the inserts before grinding is set at not less than 10° and said clearance angle at the cutting edge is reduced by the grinding, the ground area being run out within the area of the clearance face.

* * * * *